Patented Apr. 19, 1949

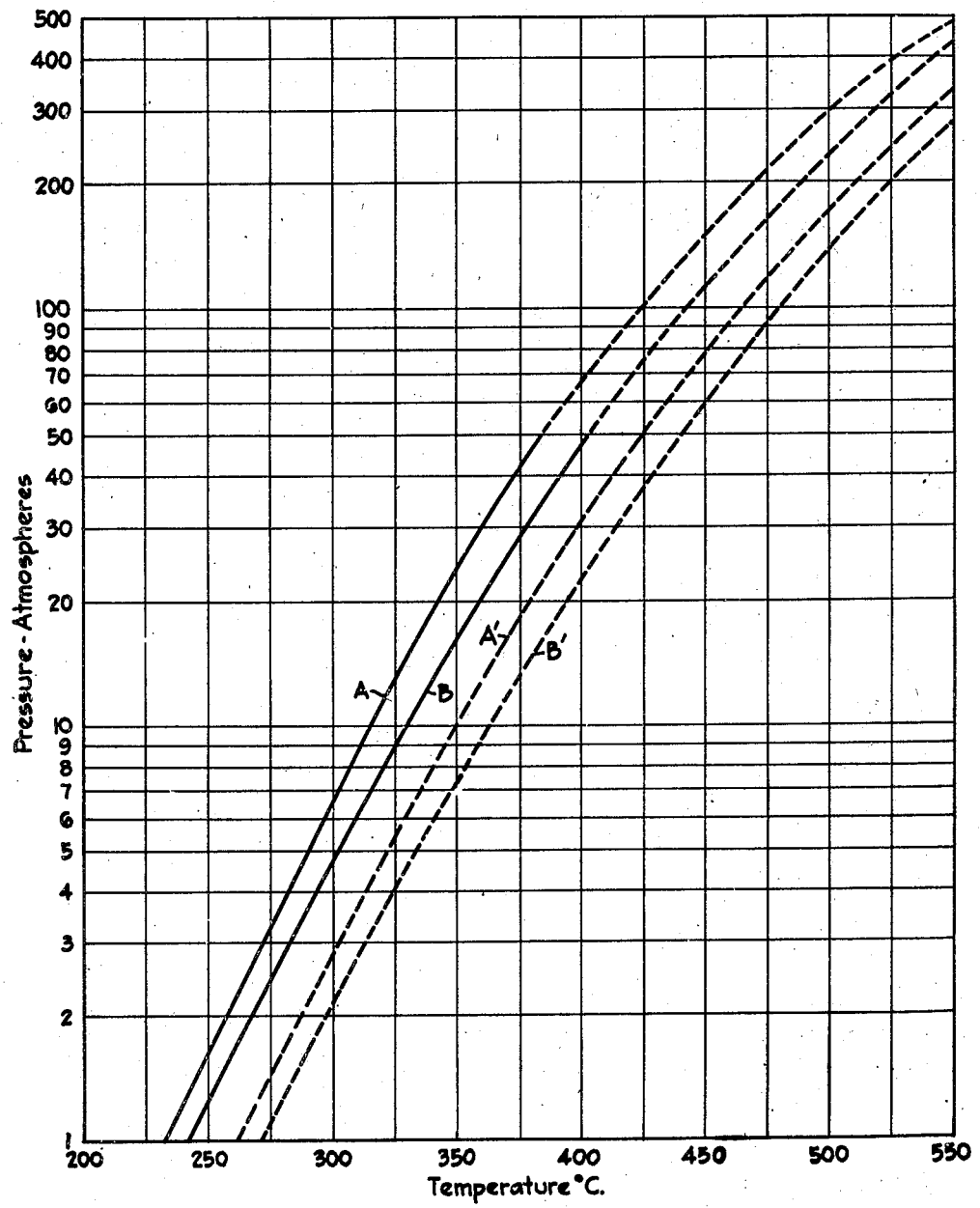

2,467,919

UNITED STATES PATENT OFFICE 2,467,919

PRODUCTION OF CYCLOHEXANE

Jan Jacob Bernard van Eijk van Voorthuysen and Willem Frederik Engel, Amsterdam, Netherlands, assignors to Shell Development Company, San Francisco, Calif., a corporation of Delaware Application December 7, 1946, Serial No. 714,834
In the Netherlands December 20, 1945

4 Claims. (Cl. 260—667)

This invention relates to the production of cyclohexane through the hydrogenation of benzene by hydrogen transfer.

The phenomenon known as hydrogen transfer, although not widely used in practice, is fairly well known. It is ascribed to an inter-molecular internal oxidation-reduction reaction between a relatively saturated compound called the hydrogen donor and a relatively unsaturated compound called the hydrogen acceptor. In a few cases, both of the products of the hydrogen transfer reaction are of value and the reaction can be considered as a sort of double conversion carried out simultaneously. In most cases, however, the reaction is considered as a means of hydrogenating a material by the use of a suitable hydrogen donor or as a means of dehydrogenating a material with a suitable hydrogen acceptor according to the results desired and the economics of the particular case. In any case, the immediate problem is the finding of a suitable hydrogen donor or hydrogen acceptor as the case may be with which to exchange hydrogen with the compound that it is desired to react. This problem seldom admits of an economic solution.

It should be emphasized that it is the relationship of the hydrogen donor to the hydrogen acceptor that is important. In other words, the roles of hydrogen donor and hydrogen acceptor are relative to each other and not the result of an intrinsic property of either of the compounds. For example, a particular compound may be a hydrogen donor in one case and a hydrogen acceptor in another. The more important relationships desired between the hydrogen donor and the hydrogen acceptor are (1) that the two compounds should not react to any appreciable extent by another mechanism; (2) that the hydrogen acceptor material should be relatively unsaturated with respect to the hydrogen donor (in general the affinity for or ease of combining hydrogen is taken as a measure of the degree of unsaturation); (3) that the compound produced from the hydrogen acceptor upon hydrogen transfer should have a greater affinity for the hydrogen than the compound produced from the hydrogen donor upon hydrogen transfer. Thus if A is the hydrogen donor, A' is the product of dehydrogenation of A, B is the hydrogen acceptor and B' is the product of hydrogenation of B, the affinity for hydrogen should be greater for B than for A' and the carbon-hydrogen bond should be stronger in B' than in A. Aside from these considerations, the hydrogen donor and acceptor must be so chosen that these compounds and their reaction products do not undergo appreciable secondary reaction under the conditions of temperature and pressure necessary for the hydrogen transfer reaction.

As an example to illustrate the above, cyclohexane, in view of its large amount of hydrogen and its ease of conversion to benzene, is in general an excellent hydrogen donor. When a relatively unsaturated material, such for example as amylene, is saturated through hydrogen transfer with cyclohexane, the amylene is converted to pentane while the cyclohexane is converted to benzene according to the equation,

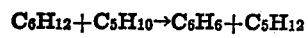

$$C_6H_{12}+C_5H_{10}\rightarrow C_6H_6+C_5H_{12}$$

This hydrogen transfer is possible, since (1) cyclohexane is much more easily dehydrogenated than pentane (in other words the carbon-hydrogen bond is stronger in pentane than in cyclohexane); (2) the benzene produced from cyclohexane on the other hand has much less affinity for hydrogen than the amylene (benzene is much more difficult to hydrogenate than amylene). In this typical example of the more usual case, cyclohexane which gives benzene upon hydrogen transfer is used as the hydrogen donor to saturate a more unsaturated compound than benzene. Benzene may, however, also be used in some cases as a hydrogen acceptor. Thus for example, benzene has been used as a hydrogen acceptor in the dehydrogenation by hydrogen transfer of such strong hydrogen donor materials, as for example hydrindane, bicyclohexyl, butyl cyclohexenol and ethoxy decalin (J. A. C. S. 63, 1320 (1941)). Hydrogen transfer between such materials and benzene, while possible, does not afford an economic means for the production of cyclohexane. Hydrogen transfer between benzene and weaker hydrogen donors such as mono alkyl-substituted cyclohexane, although not tried, is indicated to be improbable.

It has now been found that cyclohexane may be produced in a practical and economical manner by the hydrogenation of benzene through hydrogen transfer with mono alkyl-substituted cyclohexane, such for example as methyl cyclohexane. This finding was unexpected, not only because of the obviously small differences in degree of unsaturation and strength of the carbon-hydrogen bonds within the pair cyclohexane and methyl cyclohexane on the one hand and benzene and tuolene on the other hand, but also because the differences would be expected to be unfavorable to hydrogen transfer. Thus, other work (J. A. C. S. 59, 56, (1937)) has indicated that the substitution of an alkyl group in cyclohexane increases the stability of the carbon-hydrogen bonds in the cyclohexane ring. This would indicate methyl cyclohexane to be a poorer hydrogen donor than the desired product, namely cyclohexane.

The process of the present invention wherein cyclohexane is produced from the benzene by hydrogen transfer with mono alkyl-substituted cyclohexane is considered to be an important contribution to the art since it allows cyclohexane to be produced in a practical manner. Such hydrogen donor materials as hydrindane, bicyclohexyl, butyl cyclohexenol and ethoxy decalin are obtainable only in limited quantities, are relatively costly and furthermore the products of their reaction are generally of lesser value. On the other hand, methyl cyclohexane and its homologues are available in large quantities in naphthenic petroleum distillates and may be separated therefrom in relatively high concentrations at very little cost. Furthermore, the mono alkyl benzenes produced therefrom are of greater value than the starting material.

The process of the present invention in its broader and more general aspect comprises adding a mono alkyl-substituted cyclohexane to benzene to be hydrogenated, passing the mixture in vapor phase in contact with a hydrogen transfer catalyst under hydrogen transfer conditions and recovering cyclohexane from the product.

The benzene to be hydrogenated may be a pure refined benzene or it may be a crude unrefined benzene.

The preferred mono alkyl-substituted cyclohexane is methyl cyclohexane and the process will therefore be described with particular reference to this material. However, other mono alkyl-substituted cyclohexanes such as ethyl cyclohexane and propyl cyclohexane having preferably up to about 5 carbon atoms in the side chain may also be employed. The methyl cyclohexane may be a pure material, or it may be used in the form of a relatively impure concentrate. A preferred source of methyl cyclohexane is naphthenic straight run gasoline. Naphthenic petroleums usually contain small but appreciable concentrations of methyl cyclohexane (for instance 0.5 to 2%). By the best known refinery techniques, methyl cyclohexane concentrates containing in the order of 80% methyl cyclohexane may be obtained; although relatively pure methyl cyclohexane is a more desirable feed than a methyl cyclohexane concentrate containing large amounts of diluent, it is not necessary nor usually desirable to carry the concentration of the methyl cyclohexane to such a high degree of purity because of the increased costs of concentration. The methyl cyclohexane in straight run gasoline is usually present in association with some dimethyl cyclopentanes. Although a coarse separation between the methyl cyclohexane and the dimethyl cyclopentanes may be made by simple fractionation, it is difficult to separate methyl cyclohexane concentrates free of dimethyl cyclopentane. Separation of the dimethyl cyclopentanes is, however, not necessary. The methyl cyclohexane concentrate may advantageouly contain considerable amounts of dimethyl cyclopentanes and these latter compounds may supply an appreciable portion of the methyl cyclohexane reacted through isomerization to methyl cyclohexane in the reaction zone. Thus, for example, a fraction of straight run gasoline containing 50% or above of total $C_7$ naphthenes is a quite suitable feed. Preferred fractions in the case of methyl cyclohexane concentrates from straight run gasoline boil by precision distillation within the range of 80° C. and 102° C. Other suitable sources of cheap methyl cyclohexane concentrates are the naphthenic products of certain destructive hydrogenation processes and Fischer-Tropsch synthesis.

The benzene and methyl cyclohexane are as a rule combined in approximately equal molecular proportions. However, this ratio may vary considerably within reasonable limits (up to, for example, a 5:1 excess of either reactant) and as will be pointed out below, ratios other than 1:1 are often distinctly advantageous.

The reaction is effected through the agency of a hydrogen transfer catalyst. Any of the hydrogen transfer catalysts used for other hydrogen transfer reactions may be used. Thus, any of the hydrogenation-dehydrogenation catalysts may be used. (Hydrogenation and dehydrogenation are reversed reactions and a catalyst that catalyzes one will also catalyze the other. Whether a given catalyst effects hydrogenation or dehydrogenation depends upon the conditions under which it is used with the compound in question.) Preferred catalysts are the sulf-active hydrogenation-dehydrogenation catalysts. Examples of preferred catalysts are tungsten sulfide, nickel sulfide, molybdenum sulfide, molybdenum oxide, copper chromite and activated carbon. Other suitable catalysts are disclosed in U. S. Patent No. 1,960,997 and British Patent No. 406,808.

The hydrogen transfer may be carried out in the presence of an added diluent material such as nitrogen, carbon dioxide, steam, methane or hydrogen. Hydrogen in particular is a very desirable diluent. Hydrogen not only serves in its usual capacity of diminishing the contamination of the catalysts by carbonaceous deposits, but in this case also has a beneficial action on the reaction itself. When the reaction is carried out in the presence of added hydrogen, somewhat higher temperatures affording faster reaction rates may also be employed. Desirable ratios of hydrogen to hydrocarbon feed are, for example, from 1 to 30 mols of hydrogen per mol of hydrocarbon feed. The hydrogen is preferably separated from the product and recycled. During such recycle, the hydrogen gradually becomes diluted with other non-condensible gases. It is therefore desirable to bleed off a small portion of the diluted hydrogen and supply a small amount of fresh hydrogen. The necessary supply of hydrogen for this purpose may, however, be easily produced in the system by adjustment of the ratio of methyl cyclohexane to benzene in the feed and/or by adjustment of the reaction conditions. Thus by adding more than one mol of methyl cyclohexane per mol of benzene, the desired hydrogen may be continuously produced without impairing the conversion. Also, if desired, the reaction temperature may be adjusted to produce hydrogen.

The hydrogen transfer reaction may be carried out at temperatures from about 225° C. to about 550° C. The pressure may vary from substantially atmospheric pressure up to about 400 atmospheres. The conditions of temperature and pressure within these limits favoring the desired hydrogen transfer (i. e. hydrogen tranfer conditions) are inter-dependent and are furthermore dependent upon the amount of diluent, if any, applied. This relationship or inter-dependence is best indicated graphically. Thus, suitable temperatures (with no hydrogen production) are as indicated in the graph in the attached drawing, wherein suitable temperatures are shown plotted against the total pressure. Curve A is for the case of no diluent and curve B is for the case where about 5 mols of diluent per mol of benzene plus methyl cyclohexane is used. In the case of the recycle of hydrogen diluent described above where it is desired to produce some hydrogen in the process, the temperatures are on the average about 20° C. higher. Thus two curves parallel to curves A and B but displaced about 20° C. to the right may be constructed for this case. Such curves are shown in the graph as curves A' and B'. The conditions indicated by these curves, although somewhat less favorable with respect to the maximum conversion to cyclohexane obtainable in the product, have the advantage that the reaction rates are faster and consequently the actual production in the barrels of cyclohexane per liter of reaction space per hour may be increased. The percentage conversions to cyclohexane are limited by the fact that a state of equilibrium sets in. This equilibrium depends upon the reaction conditions. The reaction conditions shown by curves A and B allow approximately 80% conversion of the benzene to cyclohexane. From the curves given and described the general trends and the approximate conditions for any given pressure or temperature may be seen. It will be appreciated that while the conditions required for the desired hydrogen transfer reaction are critical, they are not so critical as to allow no deviation from the conditions indicated by the lines in the graph. On the contrary, the temperature may vary approximately 20° C. or even 30° C. from those indicated for any given pressure.

As indicated above, the percentage conversion to cyclohexane is limited by the fact that a state of equilibrium sets in. While this equilibrium conversion may be obtained in practice, it is usually more economical to operate under such conditions that the equilibrium conversion is approached but not attained. The space velocity affording this condition will in each case depend upon the activity of the particular catalyst used, as well as upon the temperature of reaction. In practice a space velocity of about 3/10 kg. of hydrocarbon feed per liter of catalyst per hour may be initially applied. The space velocities may then be adjusted according to the particular conditions to obtain the desired optimum conversion.

The conditions of temperature and pressure are preferably chosen with regard to the catalyst used. In the case of highly active metal hydrogenation catalysts (for example nickel), less severe conditions are preferred. For example a temperature between about 300° C. and 360° C., and a pressure between about 20 atmospheres and 30 atmospheres gives excellent results. When the preferred sulf-active catalysts are used somewhat higher temperatures and pressures (for example 400° C. to about 500° C. at a pressure in the range above about 30 atmospheres) are more preferably employed.

The product of the catalytic hydrogen transfer contains besides the desired cyclohexane unconverted benzene, unconverted methyl cyclohexane and toluene as well as any diluent material which may be present. Thus, in the case where the methyl cyclohexane used contains appreciable amounts of dimethyl cyclopentanes, the product also contains some of these hydrocarbons. The desired cyclohexane may be separated from the resultant mixture, either as a pure compound or as a concentrate by any one of a number of methods using known techniques. The unconverted benzene is preferably, but not necessarily, recycled. Thus, when distillation is applied, a fraction containing benzene and cyclohexane may be isolated. (The boiling points of benzene and cyclohexane are close together, whilst moreover at the ordinary pressures these substances form an azeotrope.) The fraction containing cyclohexane and unconverted benzene may then if desired be subjected to a separate hydrogenation treatment in the usual manner to convert the remainder of the benzene to cyclohexane. The hydrogen required for this purpose may advantageously be obtained from the hydrogen transfer process, as explained.

Cyclohexane is a base material of high value for various purposes. An important application of this substance is its use as base material for the production of adipic acid, one of the initial materials for the production of amino plastics, to which group the so-called nylon products belong.

The remaining components of the reaction product including, if desired, the toluene formed from the methyl cyclohexane, may be utilized as an improved component for motor fuels or utilized in any other desired manner.

The following non-limiting example is presented merely to illustrate a suitable application of the process, and the clean-cut hydrogen transfer which can be obtained.

*Example*

Methyl cyclohexane was added to benzene to form a mixture containing two mols of methyl cyclohexane per mol of benzene. This mixture was vaporized, mixed with recycle gas (impure hydrogen), and contacted with a nickel catalyst under the following conditions:

Temperature _____ 340° C.
Pressure _____ 21 atm. absolute
Space velocity _____ 0.32 kg./l. catalyst/hr.
Recycle gas _____ 156 l./kg. hydrocarbon reactant The catalyst consisted of 20% nickel applied to kieselguhr and mixed with 2 parts by weight of 1 mm. granules of pumice stone.

The composition of the reaction product, after separating non-condensible gases, was as follows:

| | Mol per cent |
|---|---|
| Cyclohexane | 25 |
| Toluene | 25 |
| Methyl cyclohexane | 42 |
| Benzene | 8 |

Thus, equal amounts of cyclohexane and toluene were produced through hydrogen exchange. The conversion of benzene to cyclohexane was 75 mol per cent. The products obtained can first be separated by distillation. The mixture of benzene and cyclohexane thereby obtained can be further treated by means of an extractive distillation with aniline or extraction with sulphurdioxide to obtain the components separately.

The invention claimed is:

1. Process for the production of cyclohexane by catalytic hydrogenation of benzene which comprises mixing with benzene from one to five mol parts of methyl cyclohexane, reacting the mixture in the vapor phase at a pressure from substantially atmospheric pressure up to about 400 atmospheres and at a temperature between about 225° C. and about 550° C. adjusted in accordance with the pressure to hydrogenate a substantial part of said benzene by hydrogen transfer and recovering the cyclohexane from the reaction product.

2. Process for the production of cyclohexane by catalytic hydrogenation of benzene which comprises mixing with benzene from one to 5 mol parts of a methyl cyclohexane concentrate of straight run gasoline, reacting the mixture in the vapor phase at a pressure from substantially atmospheric pressure up to about 400 atmospheres and at a temperature between about 225° C. and about 550° C. adjusted in accordance with the pressure to hydrogenate a substantial part of said benzene by hydrogen transfer and recovering the cyclohexane from the reaction product.

3. A process for the production of cyclohexane by catalytic hydrogenation of benzene which comprises mixing with benzene from one to five mol parts of methylcyclohexane, reacting the mixture in a first reaction zone at a pressure between substantially atmospheric pressure and about 400 atmospheres and at a temperature between about 225° C. and 550° C. correlated in accordance with the pressure to hydrogenate about 75% of the benzene, distilling the reaction mixture to separate gases and a lower boiling mixture of cyclohexane and benzene from a higher boiling fraction of methylcyclohexane and toluene, and reacting said gases and lower boiling mixture in a second reaction zone at a lower temperature than in said first reaction zone, thereby to obtain cyclohexane substantially free of benzene.

4. A process for the production of cyclohexane from benzene which comprises mixing with the benzene about 2 mol parts of methylcyclohexane to produce a mixture containing about 33 mol per cent benzene, reacting said mixture in the vapor phase at a temperature of about 340° C. and a pressure of about 21 atmospheres absolute in the presence of a nickel hydrogenation catalyst and added hydrogen, and recovering cyclohexane from the reaction product.

JAN JACOB BERNARD van EIJK
van VOORTHUYSEN.
WILLEM FREDERIK ENGEL.

REFERENCES CITED

The following references are of record in the file of this patent:

UNITED STATES PATENTS

| Number | Name | Date |
| --- | --- | --- |
| 2,328,828 | Marschner | Sept. 7, 1943 |
| 2,349,045 | Layng et al. | May 16, 1944 |
| 2,373,674 | Crawford et al. | Apr. 17, 1945 |
| 2,426,870 | Hill | Sept. 2, 1947 |

OTHER REFERENCES

Zelinsky et al., Ind. Eng. Chem., vol. 27, 1209–1211 (1935).

Adkins et al., Jour. Am. Chem. Soc., vol. 63, 1320–25 (1941).

Forziatti et al., Proc. 24th Annual Meeting A. P. I., vol. 24, III, 34–38 (1943).